United States Patent [19]

Schafer

[11] Patent Number: 4,875,667

[45] Date of Patent: Oct. 24, 1989

[54] APPARATUS FOR CLAMPING A TEMPLATE TO A WORKPIECE

[76] Inventor: Randal D. Schafer, 15713-35th Ave. West, Lynnwood, Wash. 98037

[21] Appl. No.: 150,772

[22] Filed: Feb. 1, 1988

[51] Int. Cl.$^4$ ............................................. B23Q 3/02
[52] U.S. Cl. ......................................... 269/91; 264/97
[58] Field of Search .................... 269/1, 2, 91, 93, 95, 269/97, 98, 134, 54; 144/242 R, 242 A, 242 B; 83/452, 447, 450, 445, 464, 459, 460

[56] References Cited

U.S. PATENT DOCUMENTS

| 1,410,060 | 3/1922 | Harter | 269/91 |
| 3,328,021 | 6/1967 | Wittner | 269/1 |
| 3,993,298 | 11/1976 | Marshall | 269/91 |
| 4,248,411 | 2/1981 | Wagster et al. | 269/97 |
| 4,291,868 | 9/1981 | Giles | 269/93 |
| 4,457,503 | 7/1984 | Connor | 269/91 |
| 4,487,403 | 12/1984 | Burge | 269/93 |
| 4,492,367 | 1/1985 | Cox | 269/93 |

FOREIGN PATENT DOCUMENTS 52369  3/1942  Netherlands ........................ 269/97

Primary Examiner—Robert C. Watson
Attorney, Agent, or Firm—Christensen, O'Connor, Johnson & Kindness

[57] ABSTRACT

A method and apparatus for clamping a template or the like to a workpiece. The apparatus (10) comprises a bar (12) and a clamp (14). The bar (12) has a rectangular cross-sectional shape and includes a first end (22), a second end (24), a top surface (26), a bottom surface (28) and a first end face (30). The clamp (14) comprises an L-shaped rod (34) having a first leg (36) and a second leg (38). The bar (12) has an internal axial bore (32) sized and shaped to receive the first leg (36) in slidable engagement therein. A set screw (48) retains the rod (34) within the bar (12). A clamp member (40) is slidably mounted to the second leg (38). In accordance with the method, the clamp member (40) is first adjusted to a predetermined height above the workpiece (98). The apparatus (78) is then braced against the work surface (96) by means of the clamp member (88) bearing against the bottom side (102) of the work surface (96). The bar (80) is laid over the template (100) and then a force F is applied to the second end (84) of the apparatus to force the bar to move towards the work surface (96). With the force F so applied, the bar (80) pinches the template (100) and the workpiece (98) between the bottom surface (94) and the work surface (96), thereby holding the template in place on the work surface (96).

6 Claims, 2 Drawing Sheets

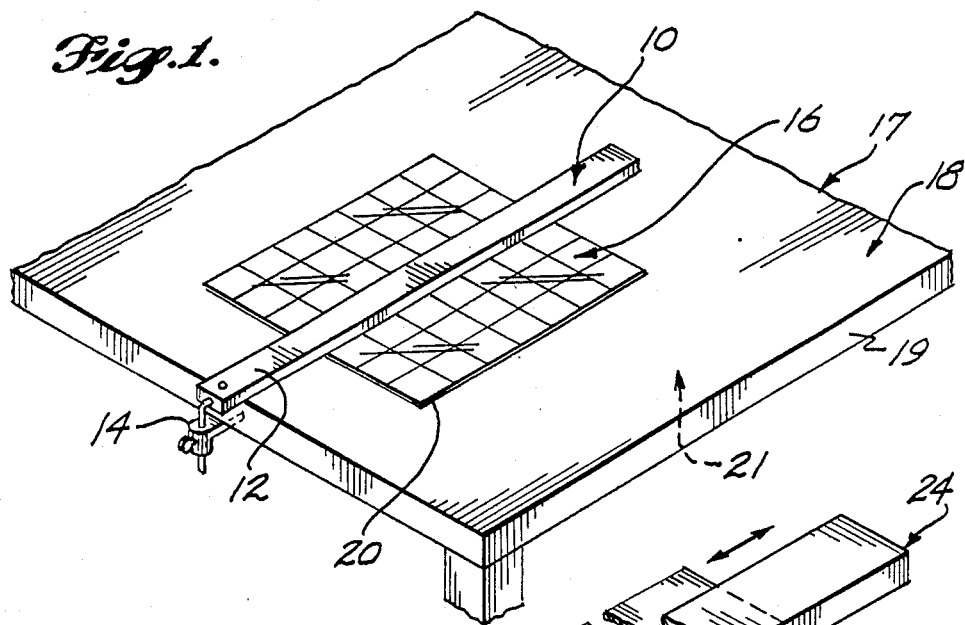
Fig.1.
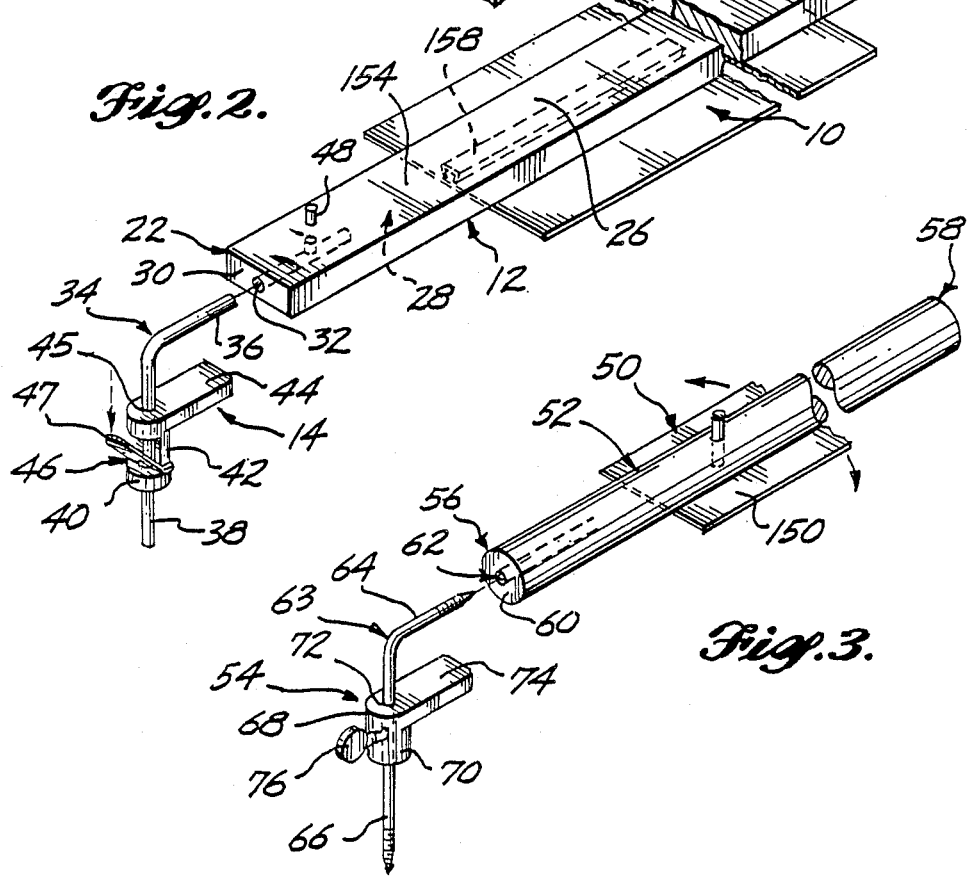
Fig.2.
Fig.3.

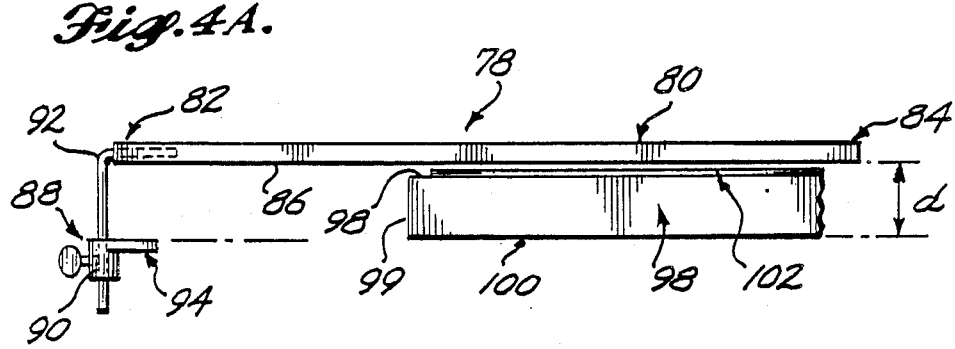
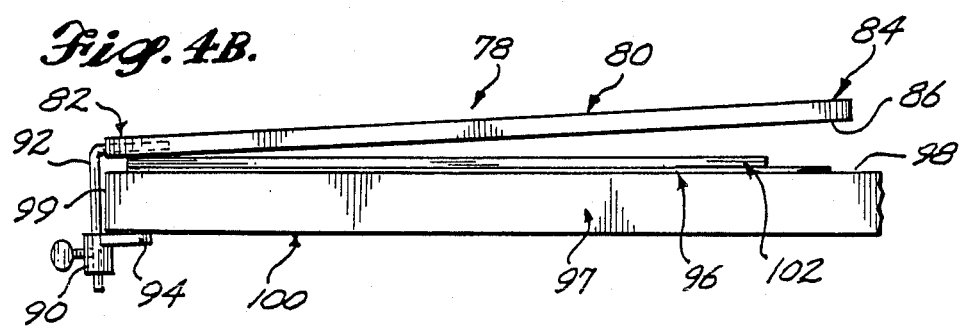
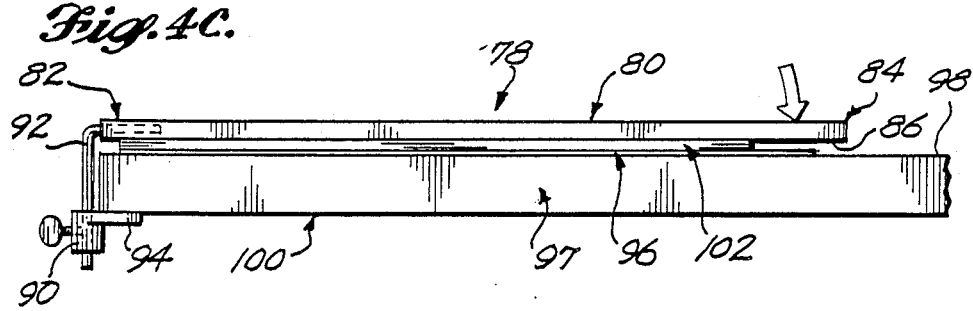
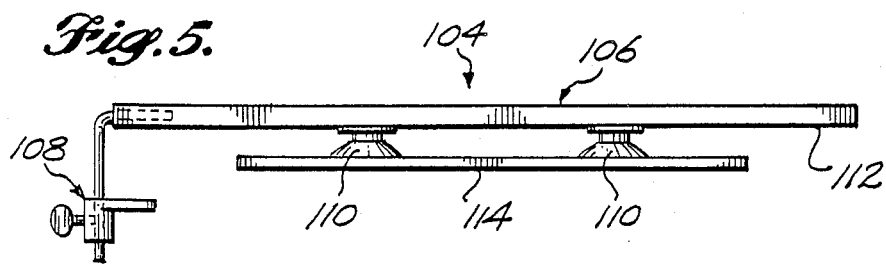

APPARATUS FOR CLAMPING A TEMPLATE TO A WORKPIECE

TECHNICAL FIELD

The present invention relates to clamping devices, and, more particularly, to a method and apparatus for clamping a template or the like to a workpiece.

BACKGROUND OF THE INVENTION

Templates, rulers, and other similar devices are used to measure and guide marking and cutting tools over the surface of a workpiece. To ensure accuracy, it is necessary that the devices be firmly held in place with respect to the workpiece. Typically, such devices have smooth planar bottom surfaces that will lie flat on the workpiece to be marked or cut. These smooth surfaces have the disadvantage of allowing the devices to easily slip on the workpiece. Thus, a certain amount of force must be applied to a device to hold it in place on the workpiece. This frequency occurs on workpieces formed of or covered with a cloth or fabric material.

In quilting applications, where large measuring devices are used to measure and to guide marking and cutting tools on large pieces of fabric, it frequently becomes necessary to use both hands to hold the device in order to prevent it from slipping on the fabric. This makes it difficult for one person to measure or cut the fabric. Many times an individual will use a foot or knee to assist the one hand in applying pressure to the device in order to free the use of the other hand. This method is awkward and is not always feasible, such as in the case of handicapped persons or where the work surface is higher than the waist.

One method used to overcome these disadvantages involves placing a rough material, such as sandpaper, on the bottom surface of the device to grip the fabric. This method has proved to be unsuitable in operations involving multiple layers of fabric because the device will only hold the top layer of fabric and not prevent slipping of the top layer over the second layer of fabric. Consequently, the layers of fabric will tend to shift positions, resulting in an uneven measurement or cut among the layers. In addition, the application of material to a transparent device will interfere with the transparency of the device. Finally, many individuals will move their hand along the device to follow the tool as the hand applies pressure, resulting in only a portion of the measuring device being held. This tends to allow the material to bunch up or creep ahead of the tool, causing inaccuracy and unevenness in the mark or cut.

SUMMARY OF THE INVENTION

In accordance with this invention, a method and apparatus for clamping a template or the like to a workpiece is provided. The method uses a clamping device having a first end and a second end. The method comprises the steps of bracing the first end of the clamping device on the work surface and then moving the second end of the clamping device toward the work surface to pinch the template between the clamping device and the workpiece, thereby holding the template steady with respect to the workpiece.

In accordance with another aspect of this invention, the method further includes the step of placing the clamping device on the workpiece over the template prior to bracing the first end of the clamping device. Alternatively, the method further comprises the step of placing the template between the clamping device and the workpiece after the step of bracing the first end of the clamping device and prior to the step of moving the second end of the clamping device.

In accordance with yet another aspect of the present invention, the method further comprises the step of adjusting the clamping device at a predetermined height above the workpiece prior to the step of bracing the clamping device on the workpiece. Ideally, the method would further include the step of measuring the thickness of the workpiece and the template to calculate the predetermined height prior to the step of adjusting the clamping device.

In accordance with still yet another aspect of this invention, a method for clamping a template or the like and a workpiece over which the template is placed to a work surface is provided. The method comprises the steps of bracing the first end of the clamping device on the work surface and moving the second end of the clamping device toward the work surface to pinch the template and the workpiece between the clamping device and the work surface, thereby holding the template and the workpiece steady with respect to the work surface.

In accordance with the present invention, an apparatus for clamping templates or the like to a workpiece is provided. The apparatus comprises a bar having a top surface, a bottom surface, a first end and a second end, with the bottom surface preferably having a planar configuration, and further including a bracing means attached to the first end of the bar for bracing the first end of the bar on the work surface. Ideally, the bracing means is adjustable to accommodate a range of work surface thicknesses.

BRIEF DESCRIPTION OF THE DRAWINGS

The foregoing and other features of the present invention will be better understood from the following description of the preferred embodiment of the invention when taken in conjunction with the following drawings, wherein:

FIG. 1 is an isometric view of the apparatus for clamping a template formed in accordance with the present invention showing a template held on a work surface;

FIG. 2 is an isometric exploded view of a preferred embodiment of the apparatus for clamping the template formed in accordance with the present invention;

FIG. 3 is an isometric exploded view of an alternative embodiment of an apparatus for clamping a template formed in accordance with the present invention;

FIGS. 4A–C are side elevational views illustrating the steps of the method of clamping the template in accordance with the present invention; and, FIG. 5 is a side view of another alternative embodiment of a clamping apparatus showing a template held to the bar by a suction device.

DETAILED DESCRIPTION OF THE PREFERRED EMBODIMENT

Referring initially to FIG. 1, a clamping apparatus 10, formed in accordance with the present invention, is shown comprised of a bar 12 and a clamp 14. The apparatus 10 is depicted holding a transparent ruler 16 to a support member 17 having an upper work surface 18, an edge 19, and a lower surface 21 adjacent to the edge 19. The transparent ruler 16 may take the form of other devices, such as a template or cutting guide of suitable thickness to provide edges 20 for guiding marking and cutting tools. Although the support member 17 is illustrated in the form of a table, any hard surface large enough to support the transparent ruler 16 and the tool 10 may be used.

As is more clearly shown in FIG. 2, the clamping apparatus 10 includes the bar 12 and the clamp 14, with the clamp 14 shown removed from the bar 12. The bar 12 has a rectangular cross-sectional shape and includes a first end 22, a second end 24, a top surface 26, a bottom surface 28 and a first end face 30. The clamp 14 comprises an L-shaped rod 34 having first leg 36 and a second leg 38 oriented substantially at right angles to each other. A clamp member 40 is slidably mounted to the second leg 38. The clamp member 40 comprises a body 42 having a ledge 44 protruding therefrom for engaging the lower surface 21 of the support member 17. The body 42 has an internal axial bore 45 sized to receive the second leg 38. A holding means in the form of a spring plate 46 mounted to the body 42 acts to prevent the clamp member 40 from sliding on the second leg 38. Such spring plates are well-known and commercially available and will not be described in detail herein. In general, in the configuration shown in FIG. 2, the edges 47 of the spring plate 46 apply pressure to the rod 34 to prevent movement of the clamp member 40 in either vertical direction. Pressure applied to the outside of the spring plate 46 will cause the spring plate 46 to pivot about a fixed point, moving the edges 47 away from the rod 34, thus freeing the clamp member 40 for vertical movement.

An internal axial bore 32 commences at the first end face 30 and extends partially through the bar 12. The first leg 36 and the second leg 38 are sized to be slidably received within the internal axial bore 32 on the bar 12. A set screw 48 screws into the top surface 26 of the bar 12 and bears against the rod 34 to retain it within the bar 12.

When assembled, the clamp member 42 slides up and down the second leg 38 to permit bracing of the apparatus 10 on work surfaces having different thicknesses. Preferably, the first leg 36 and the second leg 38 are of different lengths, thus giving a greater range in the adjustability of the clamp 14. When a relatively thin support member is being used, the longer leg will be inserted within the internal axial bore 32 on the bar 12 to prevent it from interfering with individuals moving around the support member. When a relatively thick support member is being used, the set screw 48 is backed off to permit the rod 34 to be removed from the bar 12, and the first leg 36 and the second leg 38 are positioned to have the longer leg used for the clamp member 40. Once the apparatus 10 is assembled, the clamp member 40 can be quickly adjusted by pressing on the spring plate 46 with a thumb or finger to release the clamp member 40 and then letting up on the spring plate 46 to hold the clamp member 40 in place.

FIG. 3 illustrates an alternative embodiment wherein the clamping apparatus 50 comprises an elongate pole 52 having a circular cross-sectional shape and a clamp 54. The pole 52 has a first end 56, a second end 58, and a first end face 60. An internal axial bore 62 is formed in the first end face 60 and extends partially through the pole 52. The clamp 54 includes a rod 63 having a threaded first leg 64 and a threaded second leg 66 oriented at substantially right angles to each other. The rod 63 is sized and shaped so that either of the threaded legs may be threadably fastened within the internal axial bore 62 of the pole 52. The clamp 54 further comprises a clamp member 68 formed to have a body 70 having an internal axial bore 72 through which the rod 63 extends and a ledge 74 projecting from the body 70. A thumbscrew 76 is threaded into the body 70 to bear against the leg 66 to lock the clamp member 68 to the leg 66.

The clamp 54 functions in substantially the same manner as the previously described clamp 14. However, instead of using a spring plate 46, the clamp member 68 shown in FIG. 3 is locked in position on the second leg 66 by means of a threaded fastener 76. In addition, the rod 62 is threadably engaged with the pole 52, thus eliminating the need for a set screw. As demonstrated by the alternative embodiment, the various components of the present invention may take several forms without departing from the spirit and scope of the claimed invention.

FIGS. 4A-C illustrate one method for clamping a template to a workpiece. In FIG. 4A, a clamping apparatus 78 is shown comprised of a bar 80 having a first end 82, a second end 84, a bottom surface 86 and a clamp 88 attached to the first end 82. The clamp 88 includes a clamp member 90 slidably mounted to a rod 92. A ledge 94 protrudes from the clamp member 90 substantially parallel to the bottom surface 86 on the bar 80. The clamping apparatus is shown positioned near a workpiece 96 that is resting on a support member 97 having an upper work surface 98, an edge 99, and a lower surface 100.

In the first step of the method, the clamp member 90 is adjusted to have the ledge 94 a distance d from the bottom surface 86 of bar 80 in order to firmly brace the clamping apparatus 78 to the lower surface 100 at the edge 99. Referring to FIG. 4A, the correct fit may be easily achieved by first placing a template 102 on the support member 97 and then placing the clamping apparatus 78 on top of the template 102. The clamp 88 is then abroad adjacent the edge 99 of the support member 97, and the clamp 90 is adjusted to have the ledge 94 bear against the lower surface 100 of the support member 97. With the clamp 88 secured at this position, the clamping apparatus 78 will have a snug fit when the template is clamped to one or more layers of material. Thus, when the first end 82 is braced by the clamp 88 to the edge 99 of the support member 97, and the second end 84 is forced down toward the support member 97, the bar 80 will firmly clamp the template 102 on top of the workpiece 96, thereby immobilizing the template 102 and the workpiece 96 on the support member 97.

Alternatively, the distance d, illustrated in FIG. 4A, may be determined by measuring the thickness of the support member 97 and the template 102 and calculating the distance d. The thickness of the workpiece 96 is not included in order to provide a tight fit when the support member 97, the workpiece 96, and the template are clamped between the ledge 94 and the bottom surface 86 of the bar 80. Preferably the fit will be tight enough at the first end 82 that a force will have to be applied to the bar 80 to hold the second end 84 down. The clamp member 90 is adjusted and secured to the rod 92. With the clamp member 90 so adjusted, the clamping apparatus 78 may be easily removed by lifting the second end 84 and sliding the clamp 88 out of engagement with the edge 99. The clamping apparatus 78 can easily be replaced at the same or another location on the template without disturbing the position of the template.

Referring now to FIG. 4B, at this point a template 102 or other similar device is placed on the workpiece 96. The apparatus 78 is then brought to the upper work surface 98 with the ledge 94 of the clamp member 90 bearing against the lower surface 100 of the work surface 98 as shown in FIG. 4B. The bar 80 is placed over the template 102 with the bottom surface 86 at the first end 82 in contact with the template 102.

With the apparatus 78 in place, a force F is applied to the second end 84 of the apparatus 78 to force the bar 80 to move towards the work surface 98, as shown in FIG. 4C. With the force F so applied, the bar 80 pinches the template 102 and the workpiece 96 between the bottom surface 86 and the work surface 98, thereby holding the template 102 in place on the workpiece 96. A marking or cutting tool may then be used in conjunction with the template 102 to mark or cut the workpiece 96.

Alternatively, the template 100 is placed on the top of the workpiece 96 after the apparatus 78 is first brought to the workpiece 96 and the ledge 94 engaged with the lower surface 100 of the support member 97. In another alternative, the apparatus may be clamped directly to the workpiece itself if the workpiece is sufficiently rigid to brace the apparatus. This alternative is depicted in FIG. 1 wherein the transparent ruler 16 is shown being held directly on the support member 17. This may be done where it is desired to mark or cut the work surface itself.

FIG. 5 illustrates yet another alternative of the present invention wherein a clamping apparatus 104 is shown copmrised of a bar 106, a clamp 108, and suction cups 110. The bar 106 has a rectangular cross-sectional shape and includes a bottom surface 112. The suction cups 110 are attached to the bottom surface 112 so that a template 114 will be gripped by the suction cups 110 and held in position on the bar 106. In this manner, the template 114 will remain attached to the bar 106 as the clamping device 104 is used. This feature facilitates repeated clamping of the template 114 to a workpiece when the clamping apparatus 104 must be continually moved about or the workpiece is continually moved or replaced, or when it is desired to hold the template in the same orientation with respect to the bar 106 each time the clamping apparatus 104 is used.

Other arrangements may be used to hold the template steady with respect to one axis while permitting movement along another axis, such as a center pin arrangement shown in FIG. 3 wherein the template rotates about a center pin 152 or a tongue and groove arrangement shown in FIG. 2 wherein a tongue 154 on the template 156 rides in a groove 158 on the bar so that the template 156 is prevented from moving laterally but is allowed to slide longitudinally along the bar or vice versa. While a preferred embodiment of the description has been illustrated and described, it will be understood that various changes can be made without departing from the spirit and scope of the invention. Consequently, it is to be understood that the invention can be practiced otherwise than an specifically described herein.

The embodiments of the invention in which an exclusive property or privilege is claimed are defined as follows:

1. An apparatus for clamping templates or the like to a work surface of a support member, the support member having a lower surface opposed to the work surface and an edge extending between the work surface and the lower surface, the apparatus comprising:

an elongate bar having a top surface, a first end and a second end, said bottom surface having a planar configuration; and, bracing means for bracing the first end of the bar on the work surface, the first end of the bar being rigidly attached to the bracing means, said bracing means includes a ledge having a ledge surface shaped so as to engage the lower surface of the support member and adjustment means for varying the distance between the ledge surface and the bottom surface of the bar, such that said distance can be adjusted to be less than the distance between the lower surface at the edge of the support member and the top of the template;

whereby when the apparatus is positioned on the support member on which the template and the workpiece are positioned, the template and the workpiece are between said bar and the work surface, said ledge surface releasably engages said lower surface of said support member and the template and the workpiece can be clamped to the work surface by pushing down on said second end of said bar.

2. The apparatus of claim 1, further including an aligning means for aligning the template or the like along one or more axes on the bar while permitting movement of the template along or about one or more other axes on the bar.

3. The apparatus of claim 2, wherein said aligning means comprises an opening formed in either of said bar or the template and an axle attached to the other of said bar or said template for insertion through said opening.

4. The apparatus of claim 2, wherein said aligning means comprises one or more channels formed in either of said bar or the template and a tongue means formed in the other of said bar or template for riding within said one or more grooves.

5. The apparatus of claim 1, further including a holding means for releasably holding the template to the bottom surface of said bar.

6. The apparatus of claim 5, wherein said holding means comprises one or more suction cups attached to said bottom surface of said bar.

* * * * *